UNITED STATES PATENT OFFICE.

EMILE BRONNERT, OF MULHOUSE, FRANCE.

MANUFACTURE OF VISCOSE SILK.

1,419,714. Specification of Letters Patent. Patented June 13, 1922.

No Drawing. Application filed August 30, 1920. Serial No. 406,912.

*To all whom it may concern:*

Be it known that I, EMILE BRONNERT, a citizen of the Republic of France, residing in Mulhouse, Alsace Lorraine, France, have invented certain new and useful Improvements in the Manufacture of Viscose Silk, (for which I have filed foreign applications as follows: Germany, July 18, 1919; Belgium, April 8, 1920; France, England, Italy, Austria, Hungary, Finland, Spain, Switzerland, Sweden, Norway, Netherlands, Czecho-Slovakia, Denmark, April 12, 1920, and Poland, April 26, 1920), of which the following is a specification.

The present invention relates to the application of a spinning bath containing sulphate of ammonia as well as sulphuric acid to the process of the manufacture of very fine viscose silk threads described in my co-pending United States Patent No. 1,393,198, dated October 11, 1921.

In said patent it is disclosed that when sulphuric acid is employed alone as a spinning bath the minimum limit of the said concentration might be determined in the following manner:—

Suppose the concentration of acid is expressed in grams per litre and the deniers according to the litre, and suppose further that the minimum concentration of acid C for a given denier D has been ascertained, then the approximate minimum concentration of acid $C_1$ for any desired denier $D_1$ will be given by the formula $$C_1 = \frac{C\sqrt{D}}{\sqrt{D_1}}.$$

It has been found that this law is subject to modification, if baths of sulphate of ammonia having sulphuric acid added thereto are substituted for the bath of acidified sulphate of alkali or alkaline earth having sulphuric acid added thereto or for the bath of sulphuric acid alone. In employing such solutions of ammonia salt not only the free sulphuric acid but also the sulphuric acid contained in the sulphate of ammonia itself must be duly considered, and it has been found that two parts of sulphate of ammonia must be reckoned for one part of free sulphuric acid in the formula which in the known fine spinning process from ordinary apertures of any diameter, as described in my U. S. patent aforementioned, enables the necessary minimum concentration of the sulphuric acid for one denier number of threads to be calculated from the concentration found to be a good minimum for another one. This two to one ratio between the ammonia salt and the acid may be due to the ammonium sulphate ionizing in solution so that half of the salt unionized in solution is in equilibrium with the remaining half which is ionized and the free acid added to the solution.

*Example 1.*

A bath containing 370 grams of sulphate of ammonia and 50 grams of sulphuric acid per litre is used; it is found that the amount of viscose flowing in can be adapted to a titre of 2.7 deniers per individual thread. The threads are insoluble in water and can be washed directly with water.

*Example 2.*

For a titre of 1.2 deniers per individual thread using the same viscose as in Example 1 applying the formula $$C_1 = \frac{C\sqrt{D}}{\sqrt{D_1}},$$

where $$C = \frac{370}{2} + 50,$$
$$D = 2.7 \text{ and}$$
$$D_1 = 1.2,$$

gives approximately $C_1 = 350$, which may for example be taken as $$\frac{600}{2} + 50;$$

and it is in fact found that if a bath of 600 grams of ammonium sulphate and 50 grams of sulphuric acid per litre is used for a titre of 1.2 deniers the threads can be washed with water direct and are of remarkable softness and body. A larger amount of free sulphuric acid can, of course, be used if preferred, with a correspondingly smaller amount of ammonium sulphate.

Having now particularly described and ascertained the nature of my said invention and in what manner the same is to be performed, what I claim is:

1. A process for the manufacture of very fine artificial silk fibres of from six to one deniers from raw viscose, which consists in forcing the viscose through suitable openings into a precipitating bath consisting of sulphuric acid and ammonium sulphate, the concentration of the acid component of the bath being inversely proportional to the square root of the fineness of the thread desired measured in deniers and the amount of acid per unit volume of said bath, reckoning the ammonium sulphate as equivalent to half its weight of sulphuric acid is not allowed to fall below a certain minimum weight, the said minimum being experimentally determined for any one denier number.

2. The process for the manufacture of very fine artificial silk fibres according to claim 1, wherein the experimentally determined minimum acid concentration for a thread of 2.7 deniers is taken to be furnished by a bath containing 370 grams of ammonium sulphate and 50 grams of sulphuric acid per litre.

In witness whereof I have hereunto signed my name in the presence of two subscribing witnesses.

EMILE BRONNERT.

Witnesses:
L. R. DE SALIS,
N. SCHLUMBORGE.